United States Patent

Szajwaj

(10) Patent No.: US 10,241,521 B2
(45) Date of Patent: Mar. 26, 2019

(54) METHOD, MANAGING APPARATUS AND NATURAL GAS STORAGE SYSTEM FOR THE AUTOMATED MANAGEMENT OF A PLURALITY OF THROUGHFLOW APPARATUSES

(75) Inventor: Pawel Szajwaj, Düsseldorf (DE)

(73) Assignee: Siemens Aktiengesellschaft, München (DE)

( * ) Notice: Subject to any disclaimer, the term of this patent is extended or adjusted under 35 U.S.C. 154(b) by 689 days.

(21) Appl. No.: 14/118,178

(22) PCT Filed: Apr. 24, 2012

(86) PCT No.: PCT/EP2012/057454
§ 371 (c)(1),
(2), (4) Date: Nov. 15, 2013

(87) PCT Pub. No.: WO2012/156179
PCT Pub. Date: Nov. 22, 2012

(65) Prior Publication Data
US 2014/0207294 A1   Jul. 24, 2014

(30) Foreign Application Priority Data
May 16, 2011 (DE) .................. 10 2011 075 857

(51) Int. Cl.
*G05D 7/06* (2006.01)
*G01F 15/00* (2006.01)

(52) U.S. Cl.
CPC ......... *G05D 7/0617* (2013.01); *G01F 15/003* (2013.01); *G05D 7/0658* (2013.01)

(58) Field of Classification Search
CPC . Y10T 137/0324; F16K 37/0041; B67D 7/08; B05B 12/006
(Continued)

(56) References Cited

U.S. PATENT DOCUMENTS 4,247,899 A * 1/1981 Schiller .................... B67D 7/04
222/26
5,544,672 A * 8/1996 Payne ................ B01D 19/0063
137/1

(Continued)

FOREIGN PATENT DOCUMENTS

| DE | 10 2007 041 802 B4 | 9/2008 |
| RU | 2414408 C2 | 3/2011 |
| WO | WO 2011/053992 A2 | 5/2011 |

OTHER PUBLICATIONS

Russian office Action for related Russian Application No. 2013155674 dated Mar. 1, 2016, with English Translation.
(Continued)

*Primary Examiner* — Nathan L Laughlin
(74) *Attorney, Agent, or Firm* — Lempia Summerfield Katz LLC

(57) ABSTRACT

Methods for automated management of a plurality of throughflow apparatuses, the throughflow apparatuses being configured for producing a total throughflow of a fluid into and/or out of a storage apparatus, such as a natural gas store, include inputting predefined values for the throughflow apparatuses into an input unit, transferring the input predefined values to a management unit, and using the transferred predefined values of the management unit for managing the throughflow apparatuses in the control and/or regulation thereof.

14 Claims, 2 Drawing Sheets

(58) Field of Classification Search
USPC .................................................. 700/282–283
See application file for complete search history.

(56) References Cited

U.S. PATENT DOCUMENTS

| | | | | |
|---|---|---|---|---|
| 7,107,231 | B1* | 9/2006 | Hall | G06Q 30/02 705/14.27 |
| 9,141,114 | B2* | 9/2015 | Slupphaug | G05D 7/0635 |
| 2004/0260429 | A1 | 12/2004 | Saelens | |
| 2007/0034283 | A1* | 2/2007 | Plummer | F17C 6/00 141/234 |
| 2008/0082215 | A1* | 4/2008 | McDowell | F17D 3/01 700/282 |
| 2011/0137470 | A1* | 6/2011 | Surnilla | G01C 21/26 700/282 |
| 2012/0125478 | A1* | 5/2012 | Clever | B67D 7/44 141/1 |

OTHER PUBLICATIONS

German Office Action dated Mar. 21, 2012 for corresponding German Patent Application No. DE 10 2011 075 857.7 with English translation.
International Preliminary Report on Patentability dated Jul. 30, 2013 for corresponding PCT/EP2012/057454.
PCT International Search Report and Written Opinion by the International Search Authority dated Aug. 7, 2012 for corresponding PCT/EP2012/057454.

* cited by examiner

FIG 1

METHOD, MANAGING APPARATUS AND NATURAL GAS STORAGE SYSTEM FOR THE AUTOMATED MANAGEMENT OF A PLURALITY OF THROUGHFLOW APPARATUSES

RELATED APPLICATIONS

This application is the National Stage of International Application No. PCT/EP2012/057454, filed Apr. 24, 2012, which claims the benefit of German Patent Application No. DE 102011075857.7, filed May 16, 2011. The entire contents of both documents are hereby incorporated herein by reference.

TECHNICAL FIELD

The present teachings relate to methods for the automated management of a plurality of throughflow apparatuses that are configured for producing a total throughflow of a fluid into or out of a storage apparatus. The present teachings also relate to management apparatuses for the automated management of the distributed use of the plurality of throughflow apparatuses.

BACKGROUND

Storage apparatuses have been used to store energetic fluids (e.g., natural gas). Other storage methods (e.g., storage of heated fluid or pressurized fluid) are also known. The storage apparatuses are provided with fluid via throughflow apparatuses (e.g., fluid is charged into or extracted from the storage apparatus. This type of storage apparatus may also be referred to as a buffer store.

In conventional storage apparatuses, charging and/or extraction is placed under closed-loop control by using a closed-loop control apparatus. The closed-loop control apparatus makes the desired throughflow available for the charging operation or the extraction operation. In this case, the desired throughflow is directly prescribed to the closed-loop control unit. A number of throughflow apparatuses may be provided with conventional storage apparatuses. The closed-loop control apparatus of conventional storage apparatuses may perform closed-loop control on individual throughflow apparatuses with regard to the partial volumetric flow through the respective throughflow apparatus. Thus, the closed-loop control apparatus is designed for computing algorithms in order, as a function of the desired total throughflow quantity, to select the respective throughflow apparatus for the charging operation and the extraction operation, and to perform closed-loop control on the respective volumetric flow. Inputting new values for the closed-loop control while the process is running is difficult, since it involves intervention in running processes (e.g., running computing algorithms).

The flexibility of conventional storage apparatuses during control of the charging operation and extraction operation is limited. Closed-loop control uses a high computational outlay to be undertaken by the closed-loop control of the charging operation and the extraction operation. Thus, the closed-loop control apparatus of conventional storage apparatuses is complex and cost-intensive.

SUMMARY AND DESCRIPTION

The scope of the present invention is defined solely by the appended claims, and is not affected to any degree by the statements within this summary.

The present embodiments may obviate one or more of the drawbacks or limitations in the related art. For example, in one or more of the present embodiments, a method for the automated management of a plurality of throughflow apparatuses configured for producing a total throughflow of a fluid into or out of a storage apparatus is provided. In some embodiments, a management apparatus for automated management of this method is provided. The automated management of a plurality of throughflow apparatuses may produce a total throughflow of a fluid into or out of a storage apparatus. In some embodiments, new setpoints may be input during the running operation of a closed-loop control while the complexity of a lower-order closed-loop control unit is reduced.

It is to be understood that features described in connection with a management apparatus in accordance with the present teachings are also valid in connection with a method in accordance with the present teachings, and vice versa.

A method in accordance with the present teachings may provide automated management of a plurality of throughflow apparatuses for producing a total throughflow of a fluid into and/or out of a storage apparatus (e.g., a fluid storage apparatus). In some embodiments, the storage apparatus includes a natural gas storage reservoir. A representative method includes inputting setpoints for the throughflow apparatuses into an input unit, transferring the input setpoints to a management unit, and using the transferred setpoints of the management unit to manage the throughflow apparatus in open-loop control and/or closed-loop control.

A method in accordance with the present teachings separates the input and the management of the setpoints from one another. The input and management of the open-loop control and/or closed-loop control of the throughflow apparatuses are also separated.

Thus, methods in accordance with the present teachings include two or three distinct components—for example, the input into the input unit, the transfer to the management unit, and the use in open-loop control and/or closed-loop control.

A method may be used to input the setpoints in the input unit independently of the management unit and, in some embodiments, independently of the open-loop control and/or the closed-loop control of the throughflow apparatus. The input may thus be carried out at any instant and, in some embodiments, even during the ongoing operation of open-loop control and/or closed-loop control. Thus, the operator of the method is not bound by time with regard to inputting the setpoints for the throughflow apparatuses.

The transfer of the setpoints to the management unit may allow the management unit to store the setpoints for the throughflow apparatuses and reserve the setpoints for open-loop control and/or closed-loop control. Consequently, open-loop control and/or closed-loop control by a closed-loop control apparatus does not require dedicated management of the individual throughflow apparatuses. Rather, the open-loop control and/or closed-loop control by a closed-loop control apparatus may be done using the management unit, thereby avoiding complex computing algorithms in the closed-loop control apparatus. The management unit makes the setpoints available for open-loop control and/or closed-loop control—in some embodiments to a closed-loop control apparatus—in a cost-effective and simple way.

As used herein, setpoints for the throughflow apparatuses refer to a desired throughflow value for an individual throughflow apparatus as well as the priority of each throughflow apparatus. The priority of a throughflow apparatus refers to the significance of the throughflow apparatus with regard to the selection during its management. A throughflow apparatus with a low priority number—for example, 1, 2 or 3—is selected as first, second, or third. Throughflow apparatuses with higher priority numbers have lower-order selection priority during management.

A throughflow apparatus in accordance with the present teachings includes a compressor and/or a valve (e.g., an actuator) that may be used for setting the throughflow through a throughflow apparatus. In some embodiments, setting may be done by both open-loop control and closed-loop control.

In some embodiments, the input unit and the management unit are mutually distinct units. The units may be provided both structurally (e.g., in different components) and in a software application (e.g., as different software modules). Thus, in some embodiments, methods in accordance with the present teachings may be implemented as a software module in a control programming.

In some embodiments, the storage apparatuses are natural gas storage reservoirs, and in some embodiments, the fluid is a natural gas. However, methods in accordance with the present teachings may also be used with other storage apparatuses (e.g., for storing a liquid, such as water). In some embodiments, the storage apparatuses may be configured to store the fluid at a specific temperature and/or at a specific pressure.

The input unit and the management unit may be configured such that the input of the setpoints and the transfer of the setpoints are performed in tabular fashion. As used herein, the phrase "tabular fashion" refers a matrix in which one or more setpoints are, or may be, assigned for each throughflow apparatus.

In some embodiments, the individual throughflow apparatuses for use in accordance with the present teachings may be of substantially the same kind. In some embodiments, a unique setpoint may be assigned for each throughflow apparatus. The uniformity of the throughflow apparatuses simplifies the method.

The total throughflow may be input into both the input unit and the management unit. However, a total throughflow may also be prescribed in both the input unit and the management unit in a separate central unit. The total throughflow may execute open-loop control and closed-loop control, such that there may be recourse to the central unit and the total throughflow via the management unit and the closed-loop control unit.

In contrast to conventional methodology, the open-loop control and/or closed-loop control may carry out selection or deselection of individual throughflow apparatuses independently of a computing algorithm. Having recourse to the management unit and the setpoints of the individual throughflow apparatuses present there for the purpose of open-loop control or closed-loop control allows use of these data for open-loop control or closed-loop control without further adaptation. In some embodiments, a substantially constant total throughflow may be achieved, and in some embodiments, the total throughflow is close to the prescribed total throughflow during charging and/or extraction.

In some embodiments, the setpoints input into the input unit relate, respectively, to at least to one of throughflow quantity through a throughflow apparatus and priority of a throughflow apparatus.

Priority and throughflow quantity are described above. In the priority-controlled use of individual throughflow apparatuses, the priority may be uniquely assigned for all throughflow apparatuses. In some embodiments, the throughflow quantity may be specified per time unit for each throughflow apparatus (e.g., in units of $[m^3/h]$).

In some embodiments, prior to the transfer of the input setpoints for the throughflow apparatuses, the setpoints may be checked (e.g., for plausibility) in the input unit. The setpoints are transferred to the management unit as a function of the result of the checking. The checking of the setpoints and the transfer as a function of the result of the checking reduce the likelihood of transferring incorrect (e.g., implausible) values to the management unit. In this manner, a management unit with setpoints that would lead to nonsensical open-loop and/or closed-loop control results of the throughflow apparatuses may substantially be avoided. For example, in the case of plausibility, the duplication of a priority is checked and prevented. Gaps in the priority list may be avoided in a similar way. Impossible values may likewise be avoided with regard to the throughflow quantity of individual throughflow apparatuses (e.g., throughflow quantities per time unit that cannot be made available by the respective throughflow apparatus).

The throughflow apparatuses may be monitored with regard to the transferred setpoints in the management unit. The monitoring involves feedback of the throughflow values of the individual throughflow apparatuses to the management unit. Thus, in some embodiments, an additional column is provided in the management unit in tabular fashion. The feedback of the actual throughflow values is listed for each throughflow apparatus. With the aid of the management unit and the additional feedback values, the open-loop control and/or closed-loop control may have recourse to these real values via the management unit. The selection or deselection of the next higher or next lower throughflow apparatus may be executed in combination with the prescribed setpoints of the management unit. In some embodiments, the actual parameters of the throughflow apparatuses may be continuously monitored.

In some embodiments, the total throughflow may be prescribed separately by the input unit and/or the management unit, and used in the input unit for inputting the setpoints and/or in the management unit for managing the throughflow apparatus. The previously valid setpoints may be compared with the new setpoints in reference to the total throughflow. Thus, total throughflow may be assigned directly to the individual throughflow apparatuses upon their selection. The total throughflow may thus be attained with the aid of the selected throughflow apparatuses proposed by the management unit through the priorities.

New inputs to replace previously-valid inputs may be evaluated in the input unit with the aid of the total throughflow and visualized for the inputting operator. This visualization is performed, for example, in the display of the changes that may be attained by the new inputs and the preconditions of the prescribed total throughflow. For example, throughflow apparatuses to be newly selected are displayed, and/or throughflow apparatuses to be deselected by the new inputs are visualized.

After the inputting of the setpoints, sorting may be carried out with reference to the input setpoints in the input unit. The sorting may be carried out with regard to the prioritization of the individual throughflow apparatuses. Thus, the individual throughflow apparatuses are no longer sorted with regard to their enumeration, but rather in a rising or falling fashion with regard to the variable (e.g., newly input) prioritization. The prioritization and the sorting match up after the sorting is carried out. As a result, a sorted (e.g., linked) list is transferred to the management unit and made available to the open-loop control and/or closed-loop control of the throughflow apparatuses. The open-loop and/or closed-loop control unit may be further relieved with regard to the computational algorithms. Thus, with regard to the selection or deselection of a further throughflow apparatus, the next higher or next lower in the next line in the event of a tabular listing may be used, thereby avoiding searching for the next priority in an unordered list. As a result, computational outlay may be reduced, the open-loop control and/or closed-loop control may be accelerated, and the complexity of a closed-loop control unit may be reduced.

In some embodiments, a repeated carrying out of the method acts overwrites or partially overwrites the setpoints transferred to the management unit before the repetition. For example, a partial overwriting occurs with partial changes (e.g., when only individual setpoints have been changed). In some embodiments, only the changed setpoints are overwritten for the transfer in the management unit. In order to render such checking obsolete, all the setpoints of the management unit may be overwritten upon the new inputting of new setpoints independently of the number of the changes. Errors occurring at the transfer when a method was carried out in the past have no future effect. The complete overwriting at each instant results in a "reset" to the currently valid setpoints of the input unit. In this manner, the setpoints may be changed during operation of the installation, thereby providing increased flexibility for charging into and/or extracting from a storage apparatus.

In some embodiments, the setpoints of the input unit and/or the management unit may be displayed by a display device. An input apparatus or functional equivalent thereof may also be present in addition to the display device. In some embodiments, the display device is a monitor, such as, for example, a display in the control room of a process open-loop control. In some embodiments, the display device is configured for the desired setpoints to be directly input therein. The visualization may be performed in tabular fashion. Both the input unit and the management unit may be visualized with regard to the setpoints present therein.

In some embodiments, a management apparatus for the automated management of the distributed use of a plurality of throughflow apparatuses for producing a total throughflow of a fluid into and/or out of a storage apparatus is provided. The management apparatus has at least one input unit for inputting setpoints for the throughflow apparatuses. At least one management unit is provided. The input setpoints may be transferred to the at least one management unit in order as a function thereof to be able to carry out the management of the throughflow apparatuses and perform open-loop and/or closed-loop control on them.

In some embodiments, a plurality of input units is provided in a management apparatus. The units may be designed for different charging operations (e.g., charging, extraction, or storage along different storage paths). The different storage operations may be provided with different input units. Operating staff may switch between the different input units.

The input may be done, for example, using a keyboard. The individual units may be connected for communicating signals to facilitate mutual communication. In some embodiments, a data link may take place either via direct signal lines or a radio link. The management apparatus may be provided at least partially in a memory unit of a computer, such that the management apparatus may be formed via individual software modules. A management apparatus may be designed to execute a method as described herein. In some embodiments, the same advantages that may be attained by methods in accordance with the present teachings may likewise be attained by management apparatuses in accordance with the present teachings.

BRIEF DESCRIPTION OF THE DRAWINGS

FIG. 1 shows an embodiment of a visualized tabular design.

DETAILED DESCRIPTION

Figure 2:
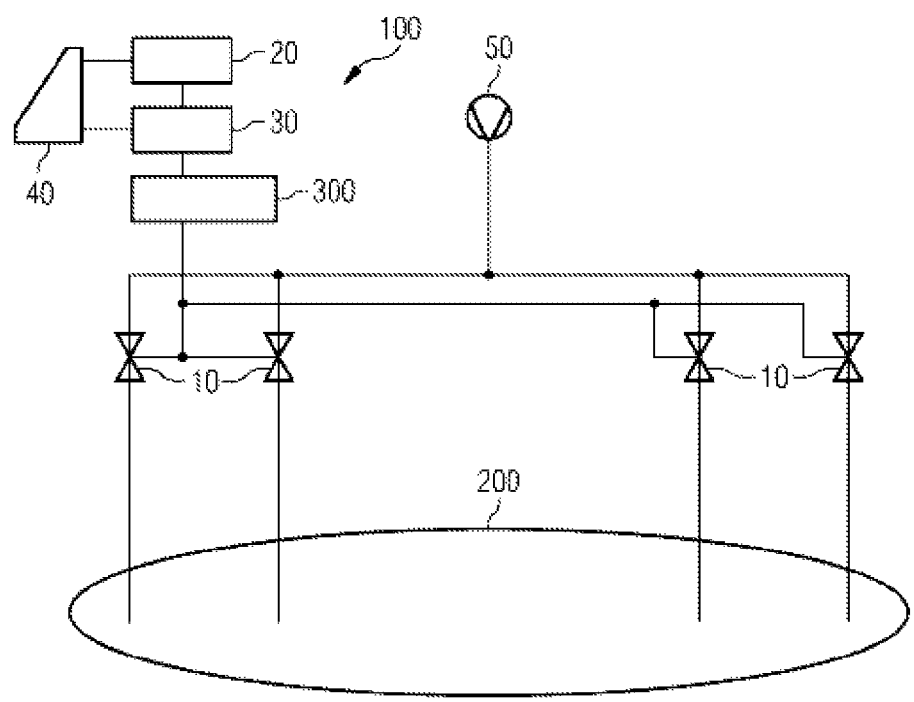
FIG. 2 shows an embodiment of a management apparatus.

A storage apparatus 200 is illustrated schematically in FIG. 2. The apparatus may be, by way of example, a cavity in a rock formation, or a container designed for storing a fluid (e.g., a gas). Individual throughflow apparatuses 10 are connected to the internal volume of the storage apparatus 200 in order to communicate fluid via pipe connections installed in wells. In some embodiments, the throughflow apparatuses 10 are in the form of valves. A compressor 50 is provided to charge fluid (e.g., natural gas) into the storage apparatus 200. The compressor may be connected to a natural gas source (not shown) for communicating fluid. The compressor may introduce natural gas into the storage apparatus 200 through the opened valves of the throughflow apparatuses 10 via the compressor function for charging. In reversed operating mode, the compressor 50 may extract natural gas from the storage apparatus 200 via the throughflow apparatus 10 in the form of opened valves. However, even without the compressor 50, the pressure of the fluid in the respective throughflow apparatus may be used for charging and/or extraction.

In the representative embodiment shown in FIG. 2, a management apparatus 100 is provided for the storage apparatus 200. The management apparatus 100 has two mutually separate units—namely, an input unit 20 and a management unit 30. Both the input unit 20 and the management unit 30 are connected to a display device 40 for communicating signals. The display device 40 may be a monitor (e.g., a touchscreen monitor) configured to receive data input. The operator of the storage apparatus 200 may input setpoints into the input unit 20 via the display device 40. In some embodiments, the display device 40 is configured as an input apparatus. The setpoints are transferred to the management unit 30 and made available there for the management of the throughflow apparatuses 10 of the closed-loop control apparatus 300. By way of example, FIG. 1 shows data input and communication between the input unit 20 and management unit 30.

Figure 1:
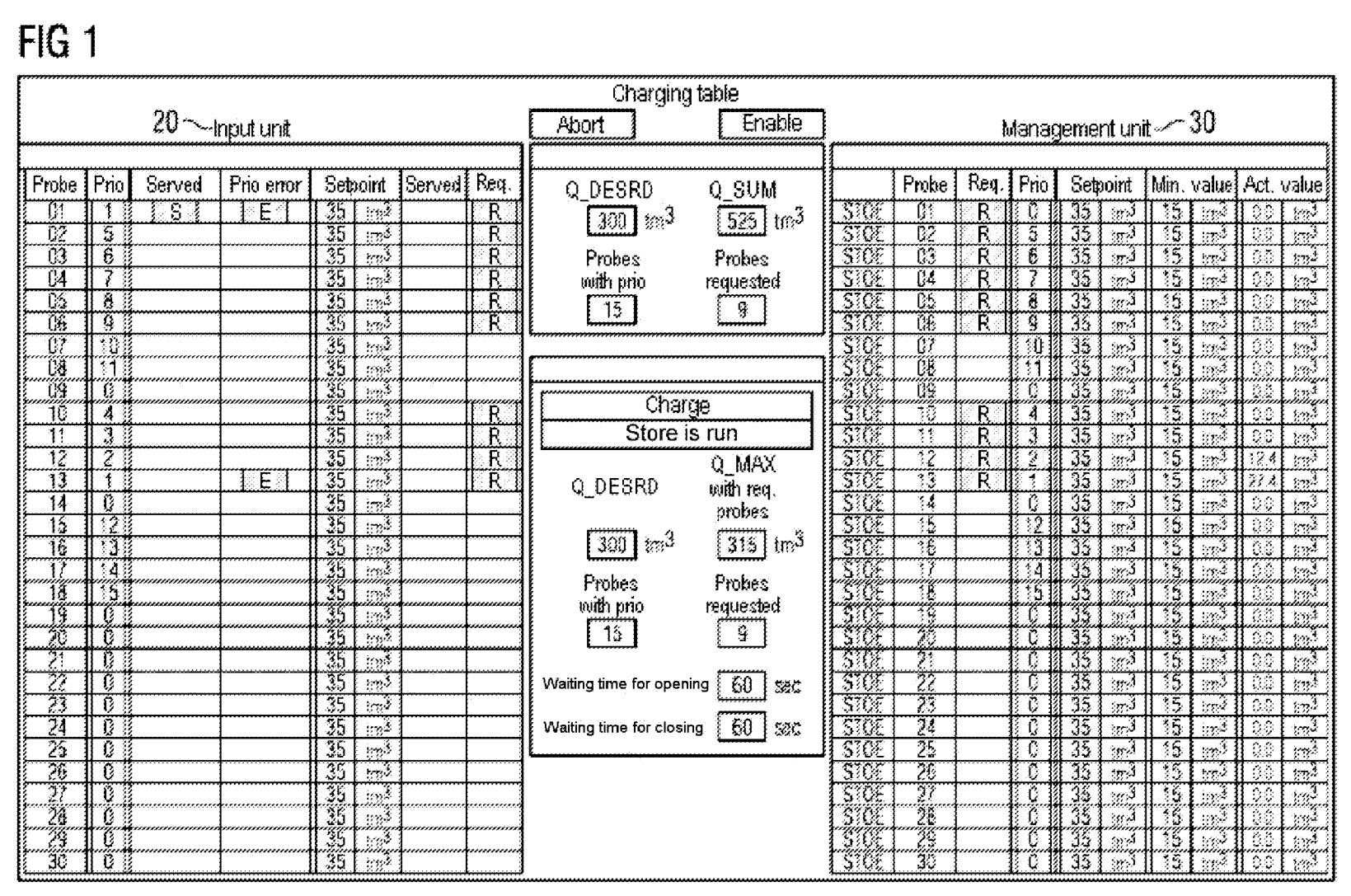

FIG. 1 shows a visualization option (e.g., displayed on the display device 40) for methods in accordance with the present teachings. The mutually separate input unit 20 and management unit 30 together produce a charging table. The input unit has the individual throughflow apparatuses 10, denoted as probes, in tabular form. The input unit may be provided with setpoints with regard to priority ("Prio"). The priority is variable. A setpoint, also provided in tabular form, may be prescribed with regard to the throughflow through the individual throughflow apparatuses 10. These two values are checked for plausibility. A shown in the exemplary illustration of FIG. 1, an error is detected in the case of the input values. There is a double occupancy with priority 1 in the probe number 1 and probe number 13. The error may be resolved before the input setpoints are transferred to the management unit 30.

In FIG. 1, the management unit 30 was previously provided with setpoints. The individual probe numberings with assigned priority and a corresponding setpoint for the throughflow quantity of the individual throughflow apparatuses 10 is provided. Minimum values and actual values are provided in tabular form in the management unit 30 as feedback from the individual throughflow apparatuses 10.

A central unit that makes a desired throughflow quantity available as total throughflow of a fluid is provided independently of the input unit 20 and management unit 30. Additional probes are selected or deselected in the management unit as a function of and in order to attain the total throughflow quantity.

The input unit 20 has a feedback function. Thus, when setpoints are changed, the changes that have been carried out in the selection of individual throughflow apparatuses 10 are shown under the keyword "Served" when the input setpoints are to be transferred to the management unit 30.

In some embodiments, as shown in FIG. 1, the individual throughflow apparatuses 10 are denoted as probe. In some embodiments, the probes are throughflow valves for the throughflow apparatuses 10.

The throughflow apparatuses 10, the compressor 50, and/or the storage apparatus 200 may have sensors in order to supply various types of information. This information may be used, for example, to determine the current throughflow quantity of one of the throughflow apparatuses 10, or to determine the current level of the storage apparatus 200. The data may be evaluated and monitored by the management unit 30.

The above embodiments describe the present invention exclusively with the aid of examples. The individual features described may be freely combined with one another insofar as technically feasible.

While the present invention has been described above by reference to various embodiments, it should be understood that many changes and modifications may be made to the described embodiments. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding claim—whether independent or dependent—and that such new combinations are to be understood as forming a part of the present specification.

The invention claimed is:

1. A method for automated management of a plurality of throughflow apparatuses configured for producing a total throughflow of a fluid into, out, or into and out of a storage apparatus, the method comprising:
   inputting a prescribed value for the total throughflow;
   inputting setpoints including a throughflow quantity and a priority for each throughflow apparatus of the plurality of throughflow apparatuses into an input unit;
   transferring the input setpoints to a management unit;
   managing the plurality of throughflow apparatuses in open-loop control, closed-loop control, or open-loop and closed-loop control using the transferred input setpoints of the management unit;
   sorting, with reference to the input setpoints and prioritization of the plurality of throughflow apparatuses, the plurality of throughflow apparatuses in the input unit after the inputting of the setpoints; and
   selecting or deselecting, by a management unit, an additional throughflow apparatus as a function of the prescribed value for the total throughflow and the input setpoints of the plurality of throughflow apparatuses,
   wherein the input setpoints for the plurality of throughflow apparatuses are checked in the input unit for plausibility before the transferring, and
   wherein the transferring of the setpoints to the management unit is a function of the checking.

2. The method as claimed in claim 1, wherein each throughflow apparatus of the plurality of throughflow apparatuses is monitored in the management unit with regard to the transferred setpoints.

3. The method as claimed in claim 2, wherein the total throughflow is separately prescribable by the input unit, the management unit, or the input unit and the management unit, and is configured for use in the input unit for inputting the setpoints, in the management unit for managing the throughflow apparatuses, or a combination thereof.

4. The method as claimed in claim 1, wherein the total throughflow is separately prescribable by the input unit, the management unit, or the input unit and the management unit and is configured for use in the input unit for inputting the setpoints, is configured for use in the management unit for managing the plurality of throughflow apparatuses, or is configured for use in the input unit for inputting the setpoints and is configured for use in the management unit for managing the plurality of throughflow apparatuses.

5. The method as claimed in claim 1, wherein a repetition of the inputting of the prescribed value, the inputting of the setpoints, the transferring, and the managing overwrites or partially overwrites the setpoints transferred to the management unit before the repetition.

6. The method as claimed in claim 1, wherein the setpoints of the input unit, the management unit, or the input unit and the management unit are, or are configured to be, displayed on a display device.

7. The method as claimed in claim 1, wherein the storage apparatus comprises a natural gas storage reservoir.

8. The method as claimed in claim 1, wherein each throughflow apparatus of the plurality of throughflow apparatuses is monitored in the management unit with regard to the transferred setpoints.

9. The method as claimed in claim 1, wherein the total throughflow is separately prescribable by the input unit, the management unit, or the input unit and the management unit, and is configured for use in the input unit for inputting the setpoints, in the management unit for managing the throughflow apparatuses, or a combination thereof.

10. A management apparatus for automated management of distributed use of a plurality of throughflow apparatuses, the plurality of throughflow apparatuses being configured for producing a total throughflow of a fluid into, out of, or into and out of a storage apparatus, the management apparatus comprising:
    at least one input unit configured to:
       input setpoints including a throughflow quantity and a priority for each throughflow apparatus of the plurality of throughflow apparatuses;
       check the input setpoints for the plurality of throughflow apparatuses for plausibility; and
       transfer the input setpoints to a management unit of the at least one management unit; and
    at least one management unit configured to:
       receive the input setpoints transferred thereto;
       perform open-loop, closed-loop, or open-loop and closed-loop control on the plurality of throughflow apparatuses;

sort, with reference to the input setpoints and prioritization of the plurality of throughflow apparatuses, the plurality of throughflow apparatuses in the at least one input unit after the input of the setpoints; and select or deselect an additional throughflow apparatus as a function of the prescribed value for the total throughflow and the input setpoints of the plurality of throughflow apparatuses, wherein the at least one input unit, the at least one management unit, at least one central unit, or any combination thereof is configured to input a prescribed value for the total throughflow, wherein the input setpoints for the plurality of throughflow apparatuses are checked in the input unit for plausibility before the transferring, and wherein the transferring of the setpoints to the management unit is a function of the checking.

11. The management apparatus as claimed in claim 10, wherein the storage apparatus comprises a natural gas storage reservoir, and wherein the management apparatus is further configured to:
input the prescribed value for the total throughflow;
input setpoints for each throughflow apparatus of the plurality of throughflow apparatuses into an input unit; and
manage the plurality of throughflow apparatuses in open-loop control, closed loop control, or open-loop and closed loop control using the transferred setpoints of the management unit.

12. The apparatus of claim 10 further comprising a display device.

13. A natural gas storage system comprising a plurality of throughflow apparatuses, a management apparatus, and a storage apparatus, wherein the management apparatus comprises:

at least one input unit configured to:
input setpoints including a throughflow quantity and a priority for each throughflow apparatus of the plurality of throughflow apparatuses;
check the input setpoints for the plurality of throughflow apparatuses for plausibility; and
transfer the input setpoints to a management unit of the at least one management unit; and at least one management unit configured to:
receive the input setpoints transferred thereto
perform open-loop control, closed loop control, or open-loop and closed loop control on the plurality of throughflow apparatuses;
sort, with reference to the input setpoints and prioritization of the plurality of throughflow apparatuses, the plurality of throughflow apparatuses in the at least one input unit after the input of the setpoint; and
select or deselect an additional throughflow apparatus as a function of the prescribed value for the total throughflow and the input setpoints of the plurality of throughflow apparatuses, wherein the at least one input unit, the at least one management unit, at least one central unit, or any combination thereof is configured to input a prescribed value for a total throughflow, wherein the input setpoints for the plurality of throughflow apparatuses are checked in the input unit for plausibility before the transferring, and wherein the transferring of the setpoints to the management unit is a function of the checking.

14. The system of claim 13, wherein the storage apparatus comprises a natural gas storage reservoir.

* * * * *